July 6, 1926. Re. 16,376
A. C. VARNUM ET AL
THREAD CLAMPING MECHANISM FOR LOOMS
Original Filed March 10, 1922
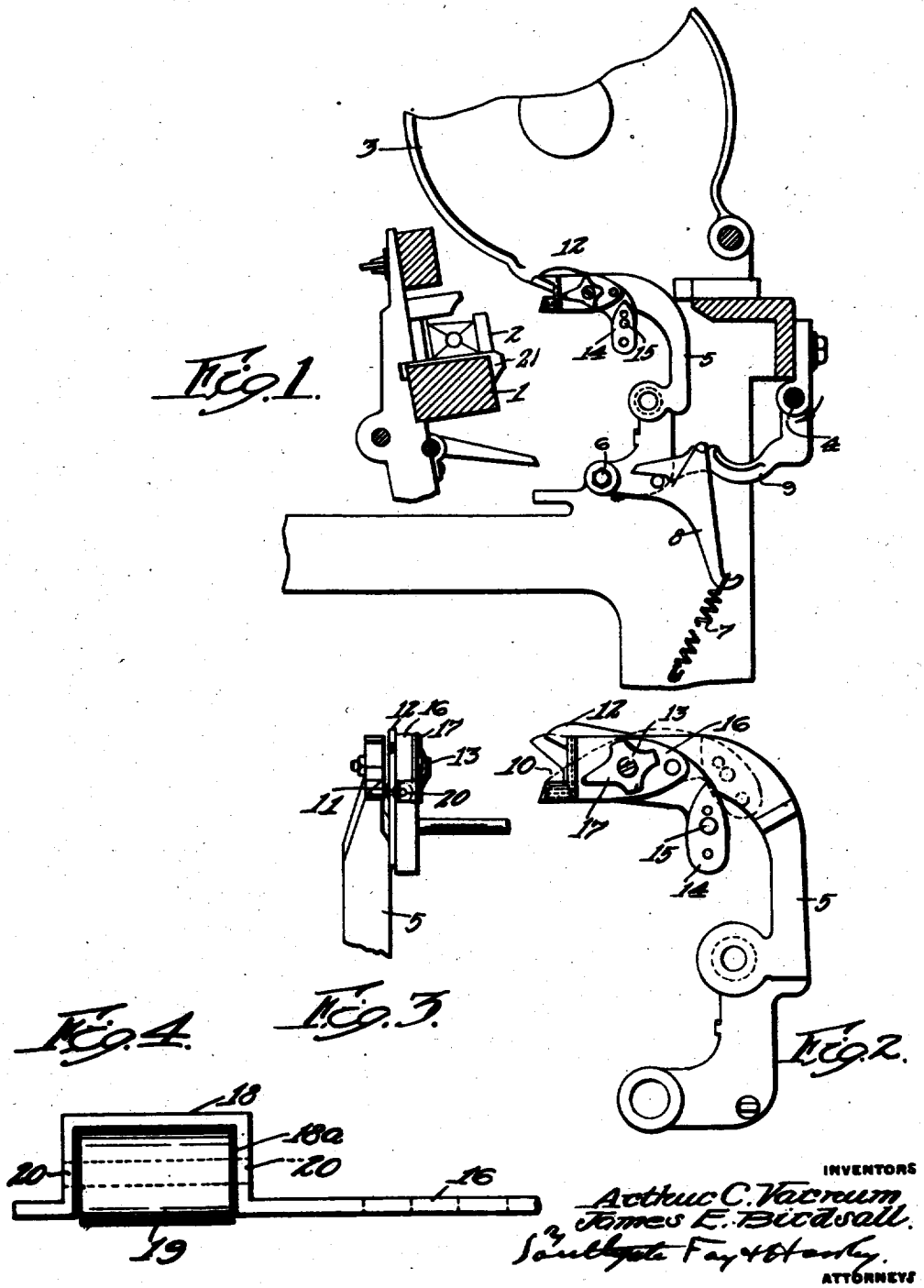
INVENTORS
Arthur C. Varnum
James E. Birdsall.
Southgate Fay & Hardy.
ATTORNEYS Reissued July 6, 1926.

Re. 16,376

UNITED STATES PATENT OFFICE.

ARTHUR C. VARNUM AND JAMES ERNEST BIRDSALL, OF SOUTHBRIDGE, MASSACHUSETTS.

THREAD-CLAMPING MECHANISM FOR LOOMS.

Original No. 1,480,480, dated January 8, 1924, Serial No. 542,668, filed March 10, 1922. Application for reissue filed December 31, 1925. Serial No. 78,689.

Our invention relates to automatic filling replenishing looms and has particular reference to looms of the type in which means are provided for parting the threads of filling carriers which are to be ejected upon filling replenishment at points adjacent the shuttle and the edge of the cloth, so that loose ends of filling will not be caught and woven into the cloth, or be left hanging to interfere with the weaving.

In looms of the above described type, it has been heretofore customary to part the thread adjacent to the shuttle by a thread parter mounted on a swinging member, which member may serve as a shuttle feeler, and then to part the thread adjacent to the edge of the cloth by a temple thread cutter.

The object of our invention is to provide improved means associated with the thread parting mechanism, adjacent to the shuttle for securely and effectively clamping either fine or coarse thread or yarn at that point, so that there will be but little possibility of the thread being pulled out of the clamp or of being parted by the clamping action prior to the parting of the thread by the temple thread cutter, all as will hereinafter more fully appear, reference being had to the accompanying drawings, in which, Fig. 1 is a transverse sectional view of a portion of a loom having our thread clamping mechanism applied thereto;

Fig. 2 is an enlarged view in side elevation showing the details of the thread clamping mechanism;

Fig. 3 is a front view of the parts shown in Fig. 2;

Fig. 4 is a plan view of the stationary thread clamping member.

Like reference characters refer to like parts in the different figures.

Referring to Fig. 1, the lay 1, carrying a shuttle box 2, is adapted to be oscillated in the usual manner by any suitable means, not shown. A portion of the magazine of the loom is indicated at 3 and a rock shaft 4, extending across the loom, is adapted to be turned in the direction of the arrow to operate the weft replenishing mechanism of the magazine. A shuttle feeler member 5, pivotally mounted on a stud 6, is normally adapted to be maintained in an inoperative position with respect to the lay 1 by means of a spring 7 acting through an arm 8, and a lever 9 mounted on the rock shaft 4 is adapted to move the feeler member 5 in the direction of the lay 1 upon operation of the filling replenishing mechanism.

As best shown in Fig. 2, the upper end of the shuttle feeler 5 is provided with a notch 10 to receive the filling thread when the feeler is moved into operative position with respect to the shuttle box 2. A fixed blade 11 is secured to the feeler 5 at the lower edge of the notch and a movable cutting blade 12 is pivotally mounted on a stud 13 extending through the feeler member 5. The movable blade 12 is provided with a heel portion 14 which is adapted to be engaged by the lay 1 when the shuttle feeler 5 is moved into its operative position, whereby the blade 12 is turned on the stud 13 to part the thread between the cooperating edges of the blades 11 and 12. The movable blade 12 is further provided with a pin 15, whereby the blade may be opened after parting the thread, as will be hereinafter described.

The parts of a loom described thus far represent a usual and well known construction and therefore, form no part of our present invention, which, as previously stated, resides in the provision of improved means for clamping the filling thread as it is severed by the blades carried by the shuttle feeler. To this end a plate 16 is mounted on the shuttle feeler 5 by the stud 13 and is held in close engagement with the movable blade 12 by means of a resilient member 17. As best shown in Fig. 4, the plate 16 is provided with an offset portion 18 located opposite to the stationary blade 11. The portion 18 provides a space $18^a$ within which is rotatably mounted a roller 19 on a pin 20 extending between the walls of the offset portion 18. The roller 19 is of such diameter that the movable cutting blade 12 is adapted to just engage the periphery of the roller when it is moved downwardly to part and clamp the filling thread, as will now be described.

When the rock shaft 4 is turned in the direction of the arrow, upon operation of the filling replenishing mechanism, the lever 9 moves the shuttle feeler 5 into the operative position shown in Fig. 1, in which the cutting blades 11 and 12 are open and the heel 14 is in the path of a projection 21 on the lay 1. As the latter completes its forward beat projection 21 engages the heel 14 and thereby turns the cutting blade 12 about its pivot in the direction of the stationary blade 11 and the roller 19. As the filling thread is parted by the edges of the blades 11 and 12, it is also clamped between the blade 12 and the roller 19. The clamping of the thread occurs without any tendency for it to be severed by the blade 12, for the reason that the rotatably mounted roller 19 turns slightly as the thread is jammed between the blade 12 and the periphery of the roller 19, thereby effectively preventing severance of the thread. As the shuttle feeler 5 returns to its inoperative position, the parted thread is still tightly clamped, so that there is no possibility of its being woven into the cloth before it is parted by the temple thread cutter. After the temple thread cutter has operated to part the thread adjacent the cloth, the pin 15 on the heel 14 is adapted to be engaged, by a suitable projection not shown, to turn the blade 12 in a clockwise direction about its pivot, and thereby release the severed thread.

From the foregoing, it is apparent that we have provided an extremely effective means for clamping a filling thread as it is severed at a point adjacent to the shuttle, and that our improved clamping means is adapted to securely hold either fine or coarse thread or yarn until it is severed by the temple thread cutter at a point adjacent the cloth. Our clamping mechanism is particularly advantageous when a filling feeler fork is employed between the temple thread cutter and the thread parting and clamping mechanism, for the reason that the thread cannot be readily drawn from the clamp as it engages the filling fork on the movement of the filling feeler. Furthermore, our improved clamping mechanism is so constructed that it is not liable to sever the thread at the point of clamping, as in previous constructions, for the reason that the roller turns slightly as the thread is wedged between the movable cutting blade and the periphery of the roller. The fact that the thread is held by rolling friction between the roll and an opposed surface allows considerable force to be applied to the movable blade for cutting without danger of the impact severing the thread at the point of clamping.

While we have shown our improved clamping mechanism in connection with a particular form of filling feeler and thread parter, it is not so limited, but is capable of being applied to other loom constructions without departing from the spirit and scope of our invention. We desire therefore that only such limitations be imposed thereon as may come within the scope of the appended claims.

We claim:

1. In an automatic filling replenishing loom, the combination with a thread parter to act upon the thread of the filling supply to be abandoned and comprising a movable blade and a surface of revolution, of means for moving said blade to clamp the thread by rolling friction between said blade and said surface of revolution.

2. In an automatic filling replenishing loom, the combination with a thread parter to act upon the thread of the filling supply to be abandoned and comprising a blade, of a freely rotatable member adapted for its movement in connection with said blade to clamp the thread between opposed surfaces of said blade and of said member, said blade and rotatable member being relatively movable bodily.

3. In an automatic filling replenishing loom, the combination with a thread parter to act upon the thread of the filling supply to be abandoned, and comprising a movable blade, of a freely rotatable roller having its axis parallel to the said blade, and dependent upon the movement of the blade to clamp the thread.

4. In an automatic filling replenishing loom, the combination with a thread parter to act upon the thread of the filling supply to be abandoned, and comprising a blade, of a relatively movable plate in engagement with said blade and carrying a freely rotatable roll with its axis parallel to said blade.

5. In an automatic filling replenishing loom, the combination with a thread parter to act upon the thread of the filling supply to be abandoned, and comprising a blade, of a plate in engagement with said blade and carrying a freely rotatable roll with its axis parallel to said blade, said plate and blade being relatively movable the said blade being substantially tangent to the surface of said roll.

6. In an automatic filling replenishing loom, the combination with a thread parter to act upon the thread of the filling supply to be abandoned, and comprising a relatively movable blade and surface of revolution, of means for causing a relative bodily movement between them to clamp the thread by rolling friction between said blade and said surface of revolution.

7. In an automatic filling replenishing loom, the combination with a thread parter to act upon the thread of the filling supply to be abandoned, of two relatively movable elements attached to the thread parter, one having a flat surface and the other a convex surface, said surfaces being adapted to engage each other for clamping the thread between them.

8. In an automatic filling replenishing loom, the combination with a thread parter to act upon the thread of the filling supply to be abandoned, of two relatively movable elements each mounted on one part of the thread parter, one having a flat surface and the other a freely movable part thereon for clamping the thread between them, one of said elements being slightly yielding.

In testimony whereof we have hereunto affixed our signatures.

ARTHUR C. VARNUM.
JAMES ERNEST BIRDSALL.